US008675985B2

(12) United States Patent
Song et al.

(10) Patent No.: US 8,675,985 B2
(45) Date of Patent: Mar. 18, 2014

(54) APPARATUS AND METHOD FOR PROCESSING IMAGE

(75) Inventors: Woo-Jin Song, Gyeongbuk (KR); Hyun Woong Cho, Gwangju (KR); Moon Kyu Song, Seoul (KR); Byoung-kwang Kim, Gyeongsangnam-do (KR); Soon-Wook Chung, Seoul (KR)

(73) Assignee: Postech Academy—Industry Foundation, Gyeongbuk (KR)

( * ) Notice: Subject to any disclaimer, the term of this patent is extended or adjusted under 35 U.S.C. 154(b) by 159 days.

(21) Appl. No.: 13/162,740

(22) Filed: Jun. 17, 2011

(65) Prior Publication Data
US 2012/0170853 A1 Jul. 5, 2012

(30) Foreign Application Priority Data

Jan. 4, 2011 (KR) .................. 10-2011-0000592

(51) Int. Cl.
*G06K 9/40* (2006.01)
*G06K 9/48* (2006.01)
*H04N 9/04* (2006.01)

(52) U.S. Cl.
USPC ................ 382/275; 382/199; 348/207.99

(58) Field of Classification Search
USPC ......... 382/173, 199, 274–275, 305, 300, 312;
348/207.99, 208.99, 208.4
See application file for complete search history.

(56) References Cited

U.S. PATENT DOCUMENTS

| | | | | |
|---|---|---|---|---|
| 5,818,527 A | * | 10/1998 | Yamaguchi et al. | 348/335 |
| 7,038,712 B1 | * | 5/2006 | Livingston et al. | 348/187 |
| 7,327,390 B2 | * | 2/2008 | Gallagher | 348/224.1 |
| 7,359,526 B2 | * | 4/2008 | Nister | 382/100 |
| 7,489,335 B2 | * | 2/2009 | Kochi et al. | 348/180 |
| 7,719,597 B2 | * | 5/2010 | Okada et al. | 348/335 |
| 7,782,387 B2 | * | 8/2010 | Azuma | 348/335 |
| 7,881,563 B2 | * | 2/2011 | Mandy et al. | 382/300 |
| 8,335,398 B2 | * | 12/2012 | Omori | 382/275 |
| 8,339,459 B2 | * | 12/2012 | Zhang et al. | 348/169 |

FOREIGN PATENT DOCUMENTS

KR    10-2010-0091383    8/2010

OTHER PUBLICATIONS

Korean Intellectual Property Office Abstract Publication No. 1020100091383A dated Aug. 19, 2010 (1 page).

(Continued)

*Primary Examiner* — Kanjibhai Patel
(74) *Attorney, Agent, or Firm* — Osha Liang LLP (57) ABSTRACT

Provided are an apparatus and method for processing an image. The apparatus includes a detector configured to form one group with pieces of pixel information on an edge of a received image, detect line segments, and generate a plurality of curves using the detected line segments, an optimizer configured to apply a weight to a cost function based on the plurality of generated curves according to distance from the center of the image, define a curve having a shorter length than a threshold value as an outlier and a curve having a greater length than the threshold value as an inlier, remove the outlier, and estimate a distortion level parameter, and a corrector configured to correct a position of a pixel with a correction value using the distortion level parameter. Accordingly, it is possible to correct lens distortion of even an image that has not been directly photographed, and to correct images generated by devices equipped with any lens rather than a specific camera or photographing apparatus.

12 Claims, 9 Drawing Sheets

(56) References Cited

OTHER PUBLICATIONS

Kim, Byoung-Kwang, Chung, Soon-Wook, Song, Moon-Kyu, Song, Woo-Jin, "Correcting Radial Lens Distortion with Advanced Outlier Elimination", Division of Electronic and Electrical Engineering, Pohang University of Science and Technology, IEEE, ICALIP 2010, Nov. 23-25, 2010, 9 pages.

* cited by examiner

APPARATUS AND METHOD FOR PROCESSING IMAGE

CLAIM FOR PRIORITY

This application claims priority to Korean Patent Application No. 10-2011-0000592 filed on Jan. 4, 2011 in the Korean Intellectual Property Office (KIPO), the entire contents of which are hereby incorporated by reference.

BACKGROUND OF INVENTION

1. Technical Field

Example embodiments of the present invention relate in general to an apparatus and method for processing an image, and more specifically, to an apparatus and method for processing an image using lens distortion correction.

2. Related Art

With the development of a high-capacity memory chip and rapid increase in computer processing speed, computer-based image processing technology is being widely used in general industries. In particular, the technology is becoming essential element technology for examination and measurement in factory automation lines, web-based real-time monitoring systems, etc. When a wide-angle lens such as a fisheye lens is used, an image of a large area can be obtained in the same field of view (FOV). However, distortion becomes severe as the distance from the center of an image increases, and thus geometric correction is needed.

In connection with correction of an input image, many researchers have reported image distortion correction technology for cameras, video cassette recorders (VCRs), etc. To correct distortion caused by a wide-angle lens, Rahul has researched a camera correction method for synthetically correcting radial distortion and decentering distortion. Weng has researched an algorithm for correcting an image input from a camera. Tsai has reported a first fast Fourier transform (FFT)-based correction formula, and used a radial distortion formula expressed by a rigid body transformation, a distance equation for a pinhole camera, and a second-order term to correct a central point of an image.

Most researchers have used a general formula of a correction model for distortion occurring in a diagonal direction, etc. of a camera whose wide angle is not large, etc., and performed correction by calculating respective coefficients using a minimizing method. Also, due to complexity of a general formula for a correction model, most researchers have ignored high-order terms and applied the correction model only to a specific distortion type in a specific vision environment.

Aberration is an important factor that determines performance of an optical system. Aberration is caused by a characteristic of a lens of a uniform curvature and refractive index, denoting a phenomenon in which an image is not normally formed and thus looks blurred or distorted.

In general, lens aberrations are classified into five types: spherical aberration, coma, astigmatism, curvature of field, and distortion, which are referred to as the Seidel aberrations.

Spherical aberration denotes a phenomenon in which a ray incident from a position far from a vertical axis passing through the center of a lens, that is, an on-axis, is refracted more than a ray incident from a position close to the on-axis, and forms an image at a position close to the lens.

Astigmatism is caused by poor grinding of a lens, a faulty lens material, temperature difference, etc.

Curvature of field denotes a phenomenon in which a ray incident from a position far from an on-axis of a lens forms an image at a position close to the lens, and thus the focus is not on a plane but on a spherical surface, resulting in a curved image.

Distortion denotes a phenomenon in which a straight line of a subject forms a curved image.

Color aberration denotes a phenomenon in which a subject appears to spread according to colors. When light passes through a lens, rays of the light are refracted according to their wavelengths. Thus, rays having relatively short wavelengths are more refracted than others, that is, rays having different wavelengths differently form an image.

Radial distortion frequently occurs in a camera equipped with a cheap lens, particularly, a fisheye lens or tilt lens. Such lens distortion occurs in all image apparatuses using a lens. When a center point of such lens distortion is not found, it is impossible to correct lens distortion, or new distortion occurs even after distortion is corrected. The problem of image distortion is very important for a digital imaging system manufacturer and a core component supplier.

To reduce lens distortion, a special material may be used for a lens, or several lenses may be attached to each other. However, this method causes an increase in the price of a lens, and thus cannot be applied to a small camera whose lens cannot be changed. Also, when several lenses are used, a distortion center is warped.

Many methods for correcting such distortion by image processing are under development. Thus far, distortion correction technology has mainly used a camera setting for photographing or an image of a specific test pattern. Such distortion correction technology is being gradually succeeded by research on an automatic correction method of correcting lens distortion using only image information without additional information.

Most conventional methods concentrate on a technique for correcting radial lens distortion that is easy to analyze and correct. In particular, research on lens distortion correction techniques based on image processing techniques has been carried out to correct lens distortion of a small camera. Mainly, research has been conducted on techniques for correcting radial lens distortion by finding the level of distortion with respect to a center point of the distortion. The overall level of distortion from a distorted image to a corrected image is calculated by performing optimization so that a set of equations describing a set of curves and aberration between a set of straight lines and the set of curves all can be solved.

SUMMARY

Accordingly, example embodiments of the present invention are provided to substantially obviate one or more problems due to limitations and disadvantages of the related art.

Example embodiments of the present invention provide an image processing apparatus using lens distortion correction.

Example embodiments of the present invention also provide an image processing method using lens distortion correction.

In some example embodiments, an image processing apparatus includes: a detector configured to form one group with pieces of pixel information on an edge of a received image, detect line segments, and generate a plurality of curves using the detected line segments; an optimizer configured to apply a weight to a cost function based on the plurality of generated curves according to a distance from a center of the image, define a curve having a shorter length than a threshold value as an outlier and a curve having a greater length than the threshold value as an inlier, remove the outlier, and estimate a distortion level parameter minimizing the cost function using the inlier only; and a corrector configured to correct a position of a pixel with a correction value using the distortion level parameter.

In other example embodiments, an image processing method includes: forming one group with pieces of pixel information on an edge of a received image to detect line segments, and generating a plurality of curves using the detected line segments; applying a weight to a cost function based on the plurality of generated curves according to a distance from a center of the image, to define a curve having a shorter length than a threshold value as an outlier and a curve having a greater length than the threshold value as an inlier; removing the outlier, and estimating a distortion level parameter minimizing the cost function using the inlier only; and correcting a position of a pixel with a correction value using the distortion level parameter.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, example embodiments of the present invention will be described with reference to appended drawings.

Figure 1:
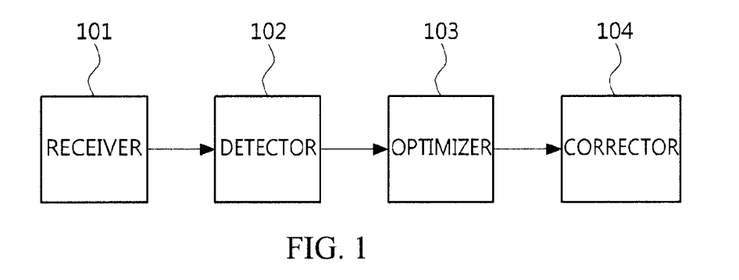
FIG. 1 is a block diagram of an image processing apparatus according to an example embodiment of the present invention.

FIG. 1 is a block diagram of an image processing apparatus according to an example embodiment of the present invention.

Referring to FIG. 1, an image processing apparatus may include a receiver 101, a detector 102, an optimizer 103, and a corrector 104.

The detector 102 forms one group with pieces of pixel information on an edge of an image in which lens distortion has occurred received by the receiver 101, thereby detecting line segments. Also, the detector 102 generates a curve by connecting line segments shorter than a threshold value among the detected line segments and a curve by connecting line segments having different distances and angles.

The optimizer 103 applies a weight to a cost function based on the curves generated by the detector 102 according to distance from the center of the image, defines a curve having a shorter length than the threshold value as an outlier and a curve having a greater length than the threshold value as an inlier, removes the outlier, and estimates a distortion level parameter that minimizes the cost function. In an example embodiment of the present invention, the optimizer 103 randomly selects one of M line segments on the basis of a random sample consensus (RANSAC) algorithm, estimates a distortion parameter whereby a cost function according to a distortion level parameter $k_3$, which has the greatest influence on the level of distortion of the selected curve, is minimized using a Levenberg-Marquardt method, linearizes all of the M line segments using the estimated distortion parameter according to Equation 1, which will be described later, calculates errors of all pixels constituting detected curves, counts pixels whose errors have absolute values greater than a specific threshold value, estimates a curve as an outlier when a number of counted pixels in the curve is more than a specific ratio according to the number of pixels in the curve, and removes the curve.

The optimizer 103 using the RANSAC algorithm expresses the cost function as distance between pixels of a linearized curve and the original curve, and uses a second-order term as shown in Equation 2, which will be described later, to detect a parameter whereby the cost function is minimized. However, it is to be understood that the present invention is not limited to a cost function as shown in Equation 2, and can be applied to all models capable of minimizing the cost function.

The corrector 104 corrects a position of a pixel using the distortion level parameter estimated by the optimizer 103. Here, a correction value is set by interpolation between pixel values corrected to an area around coordinates of the pixel. A structure of lens distortion modeling applied to an image processing apparatus according to an example embodiment of the present invention will be described in detail below with reference to FIG. 2.

Figure 2:
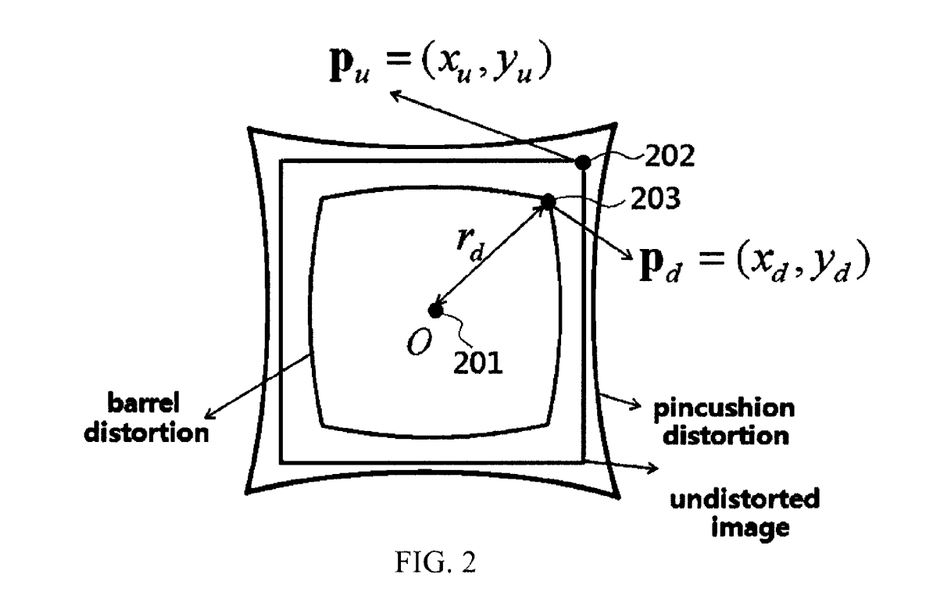
FIG. 2 illustrates a structure of lens distortion modeling applied to an image processing apparatus according to an example embodiment of the present invention.

FIG. 2 illustrates a structure of lens distortion modeling applied to an image processing apparatus according to an example embodiment of the present invention.

Referring to FIG. 2, $P_u=(x_u, y_u)$ denotes coordinates of an image in which lens distortion has not occurred, and $P_d=(x_d, y_d)$ denotes coordinates of an image in which lens distortion has occurred. Radial lens distortion is modeled as a function of distance from a pixel corresponding to coordinates of the image in which lens distortion has occurred to an image center O 201. Lens distortion modeling is described as Equation 1 below.

$$x_u = x_d + (x_d - C_x)\sum_{i=1}^{\infty} \kappa_i r_d^{i-1}$$ [Equation 1]

-continued $$y_u = y_d + (y_d - C_y)\sum_{i=1}^{\infty} \kappa_i r_d^{i-1}$$

Referring to Equation 1, rd denotes distance from a distorted pixel in an image in which lens distortion has occurred to an image center, and is expressed as $r_d = \sqrt{(x_d-C_x)^2+(y_d-C_y)^2}$. $x_u$ denotes an X coordinate of an image in which lens distortion has not occurred, $y_u$ denotes a Y coordinate of the image in which lens distortion has not occurred, $x_d$ denotes an X coordinate of the image in which lens distortion has occurred, and $y_d$ denotes a Y coordinate of the image in which lens distortion has occurred. $C_x$ denotes an X coordinate of the image center, and $C_y$ denotes a Y coordinate of the image center. k is a parameter denoting the level of lens distortion. The parameter k denoting the level of lens distortion moves from coordinates $P_u=(x_u, y_u)$ 202 of the image in which lens distortion has not occurred to coordinates $P_d=(x_d, y_d)$ 203 of the image in which lens distortion has occurred. The movement of the parameter k denoting the level of lens distortion is not limited to specific coordinates, and the entire image is distorted according to a fixed value of k and distance.

In general, manufacturers of image photographing apparatuses using a low-cost lens do not provide a factory aberration parameter. Thus, manufacturers of digital image photographing apparatuses often do nothing to correct factory aberration, resulting in lens distortion. An image in which lens distortion has not occurred and an image in which lens distortion has occurred due to lens distortion modeling applied to an image processing apparatus according to an example embodiment of the present invention will be described below with reference to FIGS. 3 to 5.

Figure 3:
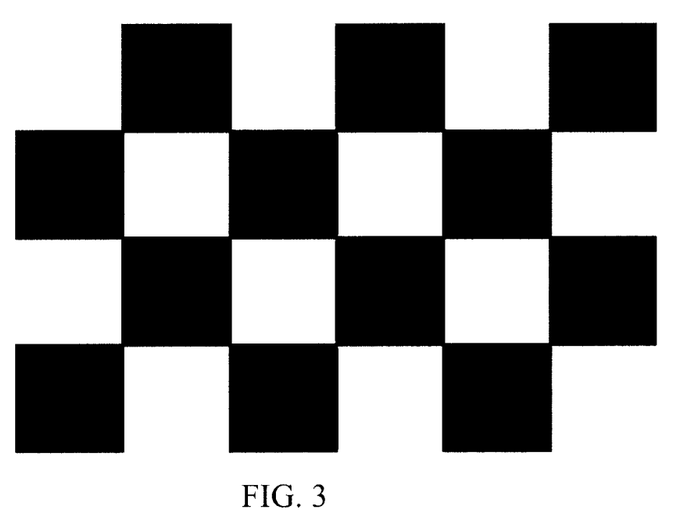
FIG. 3 shows an example of an image in which lens distortion has not occurred due to lens distortion modeling applied to an image processing apparatus according to an example embodiment of the present invention.
Figure 4:
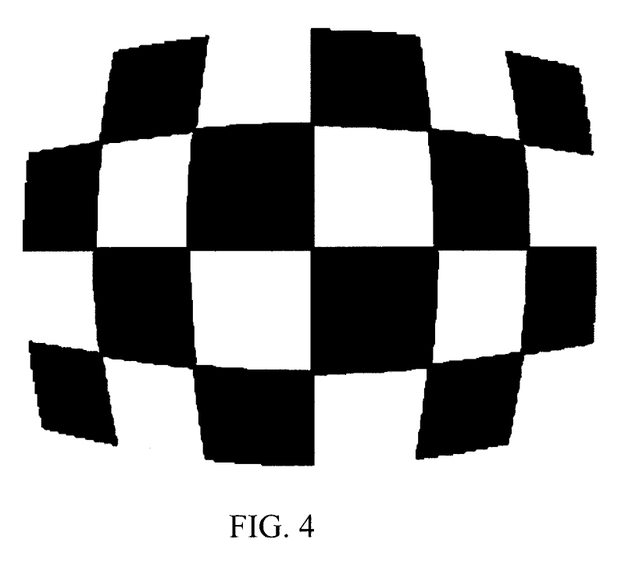
FIGS. 4 and 5 show examples of an image in which lens distortion has occurred due to lens distortion modeling applied to an image processing apparatus according to an example embodiment of the present invention.
Figure 5:
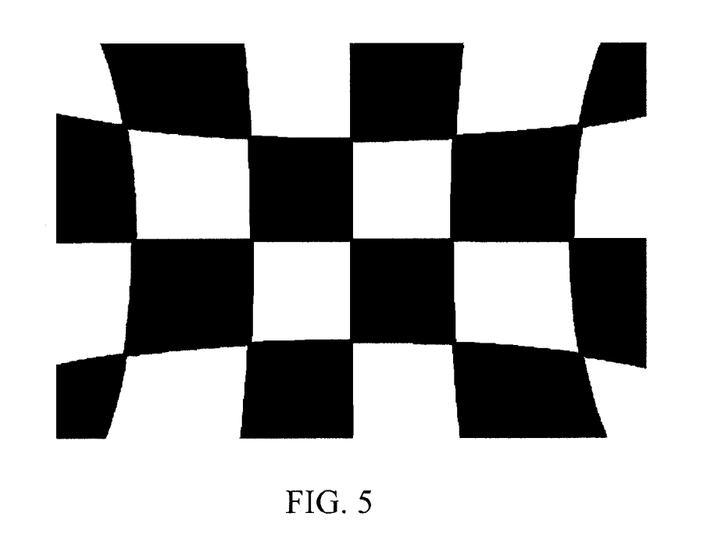

FIG. 3 shows an example of an image in which lens distortion has not occurred due to lens distortion modeling applied to an image processing apparatus according to an example embodiment of the present invention, and FIGS. 4 and 5 show examples of an image in which lens distortion has occurred due to lens distortion modeling applied to an image processing apparatus according to an example embodiment of the present invention.

Referring to FIGS. 3 to 5, FIG. 3 shows a general image in which lens distortion has not occurred, FIG. 4 shows an image in which barrel distortion has occurred due to lens distortion modeling applied to an image processing apparatus according to an example embodiment of the present invention, and FIG. 5 shows an image in which pincushion distortion has occurred due to lens distortion modeling applied to an image processing apparatus according to an example embodiment of the present invention. A simplified model for determining that barrel distortion and pincushion distortion have occurred as shown in FIGS. 4 and 5 will be described below with reference to Equation 2.

$$x_u=x_d+x_d(k_3r_d^2)$$

$$y_u=y_d+y_d(k_3r_d^2)$$ [Equation 2]

Referring to Equation 2, $r_d$ denotes distance from a distorted pixel in an image in which lens distortion has occurred to an image center, and is expressed as $r_d = \sqrt{(x_d-C_x)^2+(x_y-C_y)^2}$. $x_u$ denotes an X coordinate of an image in which lens distortion has not occurred, $y_u$ denotes a Y coordinate of the image in which lens distortion has not occurred, $x_d$ denotes an X coordinate of the image in which lens distortion has occurred, and $y_d$ denotes a Y coordinate of the image in which lens distortion has occurred. k is a parameter denoting the level of lens distortion. When a value of $k_3$ among k, is analyzed to have the greatest influence on the level of distortion, the level of distortion is estimated in consideration of $k_3$ only. When $k_3$ is greater than 0, it is determined that barrel distortion has occurred as shown in FIG. 4. On the other hand, when $k_3$ is smaller than 0, it is determined that pincushion distortion has occurred as shown in FIG. 5. In this way, the parameter k denoting the level of distortion is automatically obtained, a user can perform upgraded calibration, and a manufacturer of a digital image photographing apparatus can use a low-cost lens in a high-quality image photographing apparatus. A process in which the detector 102 of the image processing apparatus according to an example embodiment of the present invention detects a curve will be described in detail below with reference to FIG. 6.

Figure 6:
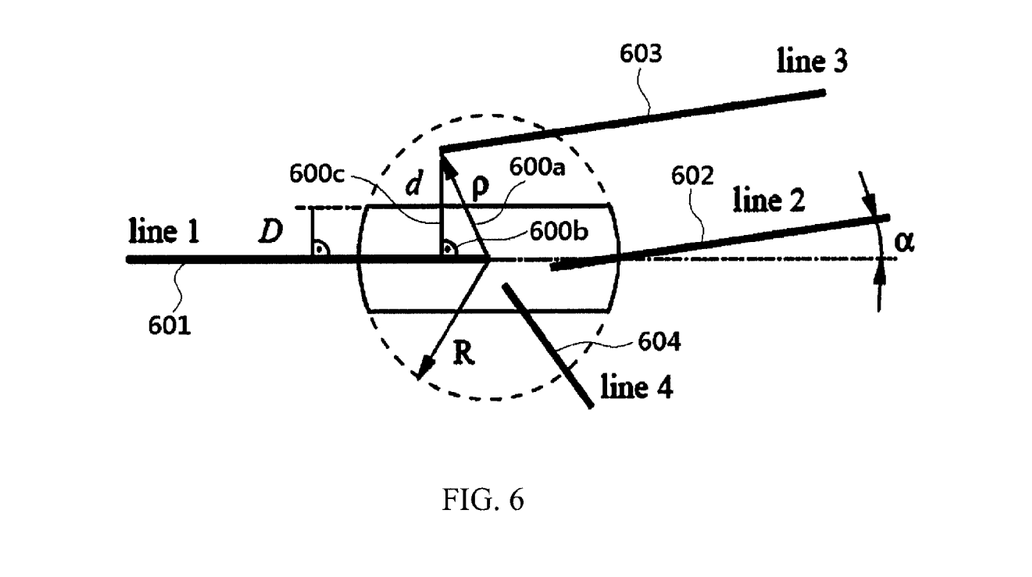
FIG. 6 illustrates a process in which a detector of an image processing apparatus according to an example embodiment of the present invention detects a curve.

FIG. 6 illustrates a process in which the detector 102 of the image processing apparatus according to an example embodiment of the present invention detects a curve.

Referring to FIG. 6, the detector 102 forms one group with pieces of pixel information on an edge of an image received from the receiver 101, thereby detecting line segments. At this time, a plurality of short line segments 601, 602, 603 and 604 constituting a curve are detected. To form one group with various line segments constituting one curve, the detector 102 examines a relation between line segments and determines groups to which the line segments belong. To include line segments in the same group, that is, the same curve, the detector 102 measures a distance p 600a, an angle a 600b, and a vertical distance d 600c between the line segments for each line segment and connects the line segments. When all of the distance 600a, the angle 600b, and the vertical distance 600c between the line segments are smaller than threshold values, the detector 102 designates the line segments as one group, and limits a line connected with line 1 601 to line 2 602. A group indicating a curve in which such line segments are connected may be expressed, and each group stores values of pixels constituting one curve.

Using such detected curves, the optimizer 103 estimates a lens distortion parameter for linearizing curves. When curves detected by the detector 102 are very short, it is difficult to estimate a lens distortion parameter, and a large estimation error occurs. Also, curves shown in an image include actual curves of a photographed subject as well as straight lines bent by lens distortion. In particular, when lens distortion occurs near the center of an image, distance from the center is short, and very little lens distortion occurs. For this reason, when the optimizer 103 estimates a lens distortion parameter using lines that have been little distorted because of short distance from the center as well as other lines, accuracy deteriorates, and the corrector 104 cannot perform correction accurately.

Thus, the optimizer 103 applies a weight to a cost function based on curves generated by the detector 102 according to distance from an image center, classifies the curves into outliers and inliers, removes the outliers, and then estimates a distortion parameter using the inliers. In an example embodiment of the present invention, the optimizer 103 randomly selects one of M curves generated by the detector 102 on the basis of the RANSAC algorithm, and estimates a distortion parameter whereby a cost function according to the distortion level parameter $k_3$, which has the greatest influence on the level of distortion of the selected curve, is minimized using the Levenberg-Marquardt method. The optimizer 103 linearizes all of the M curves using the estimated distortion parameter according to Equation 1, calculates errors of all pixels constituting detected curves, counts pixels whose errors have absolute values greater than a specific threshold value, and defines a curve as an outlier when a number of counted pixels in the curve is more than a specific ratio according to the number of pixels in the curve.

In an example embodiment of the present invention, the optimizer 103 using the RANSAC algorithm expresses the cost function as distance between pixels of a linearized curve and the original curve, and uses a second-order term as shown in Equation 3, which will be described below, to detect a parameter whereby the cost function is minimized. However, it is to be understood that the present invention is not limited to a cost function as shown in Equation 3, and can be applied to all models capable of minimizing the cost function.

The optimizer 103 estimates a distortion level parameter that minimizes the cost function.

$$\epsilon_n = \begin{bmatrix} n_x \\ n_y \end{bmatrix}^T \begin{bmatrix} x_{u,n} \\ y_{u,n} \end{bmatrix} - d_0 \quad \text{[Equation 3]}$$

$$\epsilon = \sum_{n=1}^{N_m} (\epsilon_n)^2$$

Figure 7:
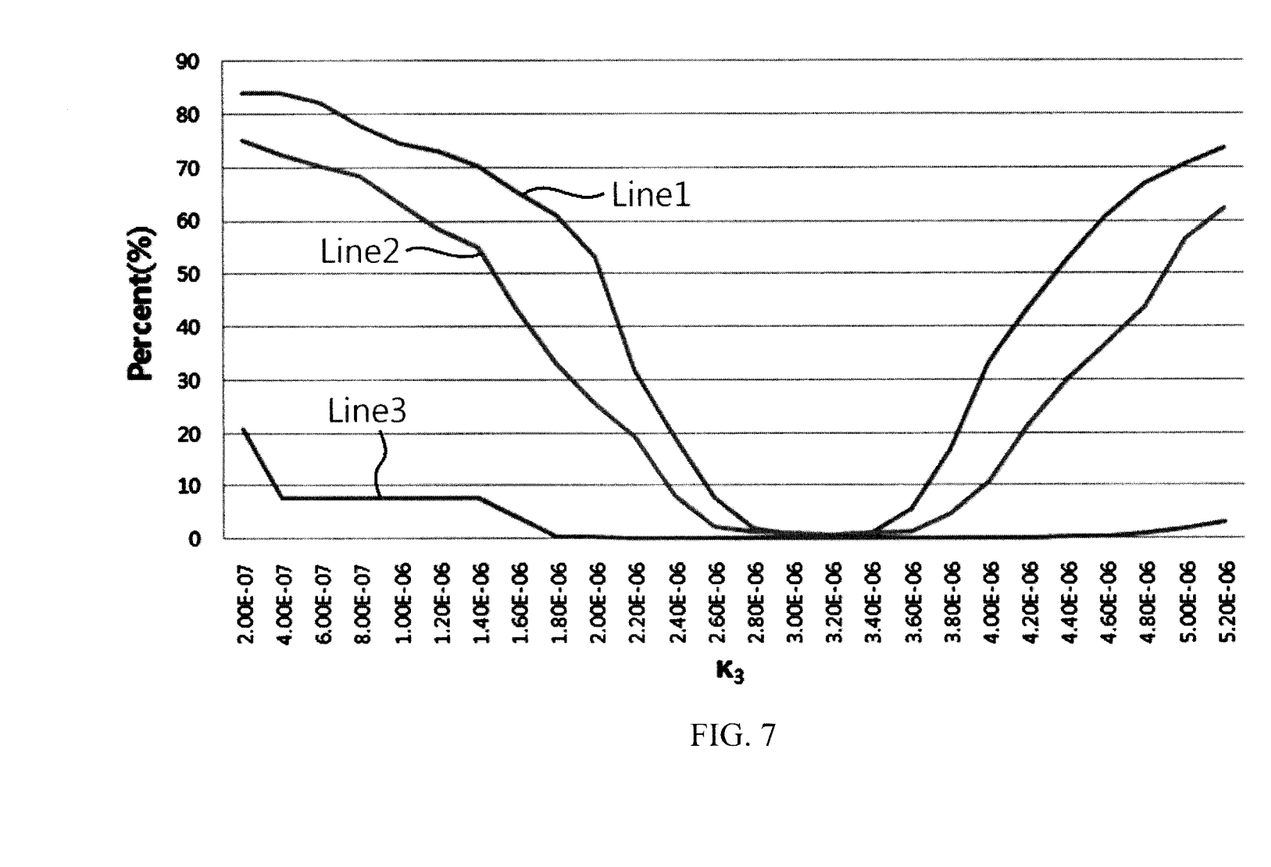
FIG. 7 is a graph of error pixel ratio versus lens distortion correction parameter according to a cost function to which an optimizer of an image processing apparatus according to an example embodiment of the present invention has not applied a weight according to a curve generated by a detector.
Figure 8:
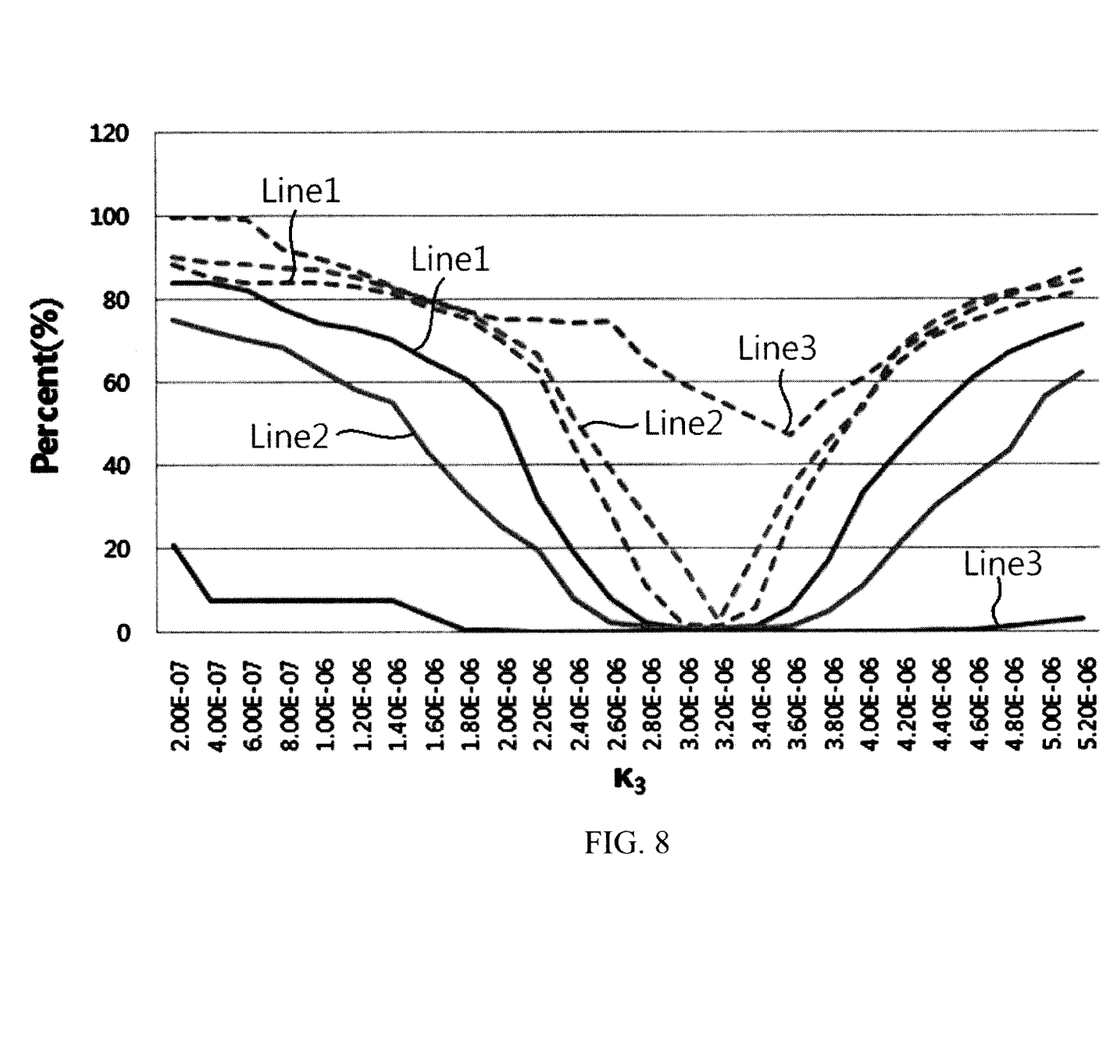
FIG. 8 is a graph of error pixel ratio versus lens distortion correction parameter according to a cost function to which an optimizer of an image processing apparatus according to an example embodiment of the present invention has applied a weight according to a curve generated by a detector.

FIG. 7 is a graph of error pixel ratio versus lens distortion correction parameter according to a cost function to which the optimizer 103 of the image processing apparatus according to an example embodiment of the present invention has not applied a weight according to a curve generated by the detector 102, and FIG. 8 is a graph of error pixel ratio versus lens distortion correction parameter according to a cost function to which the optimizer 103 of the image processing apparatus according to an example embodiment of the present invention has applied a weight according to a curve generated by the detector 102.

Referring to FIGS. 7 and 8, when the optimizer 103 uses a cost function of Equation 3 according to curves generated by the detector 102, outlier differentiation performance according to a lens distortion correction parameter is obtained as shown in FIG. 7. Here, lines near the center of an image in which lens distortion has occurred are little sensitive to a change in parameter, and thus do not become outliers for a very wide range of $k_3$ when a threshold of 20% is used. For this reason, when the optimizer 103 applies a weight to the cost function using distance from the center of lens distortion to a curve generated by the detector 102, outliers according to a lens distortion correction parameter are obtained as shown in FIG. 8. In other words, an outlier removal method is improved, which may result in improvement in a lens distortion correction function. A process in which the optimizer 103 of the image processing apparatus according to an example embodiment of the present invention applies a weight to a cost function using distance from a center of lens distortion to a curve generated by the detector 102, to differentiate the curve as an outlier or inlier will be described below with reference to FIG. 9.

Figure 9:
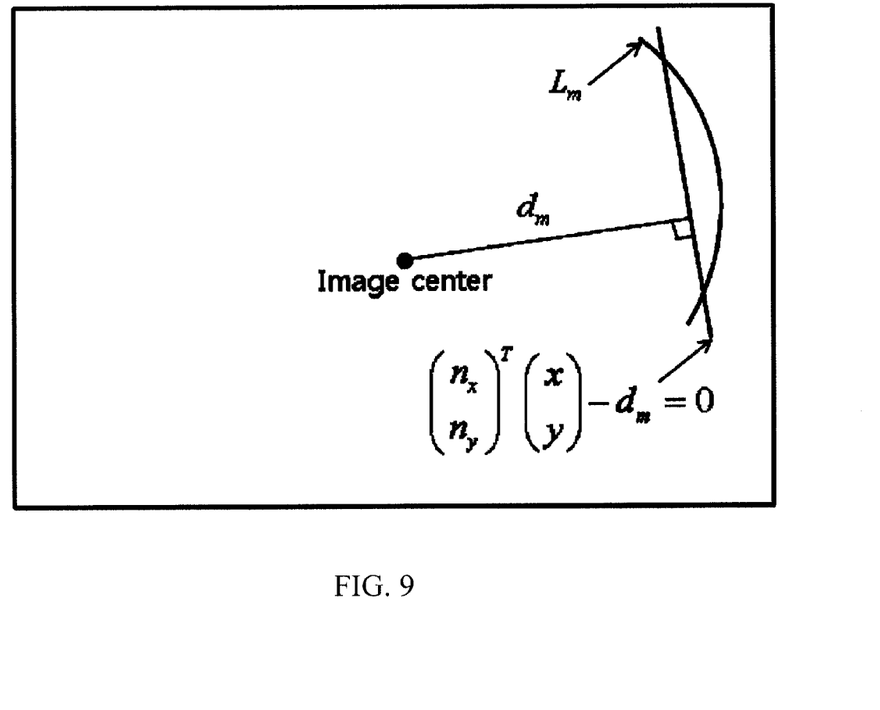
FIG. 9 illustrates a case in which an optimizer of an image processing apparatus according to an example embodiment of the present invention applies a weight to a cost function using distance from a center of lens distortion to a curve generated by a detector, to differentiate the curve as an outlier or inlier.

FIG. 9 illustrates a case in which the optimizer 103 of the image processing apparatus according to an example embodiment of the present invention applies a weight to a cost function using distance from a center of lens distortion to a curve generated by the detector 102, to differentiate the curve as an outlier or inlier.

Referring to FIG. 9, the optimizer 103 applies weights to a cost function based on curves generated by the detector 102 according to distance between the curves and a lens distortion center, thereby classifying the curves as outliers and inliers. To find a parameter that minimizes the cost function, the optimizer 103 uses a diagonal length as shown in Equation 4.

It is to be understood that the present invention is not limited to a weight of Equation 4, and can be applied to all models making use of distance between a curve and the center of lens distortion.

$$\epsilon_{m,max} = \frac{2d_m}{\text{(Diagonal Length of Image)}} \times \delta_{max} \quad \text{[Equation 4]}$$

When the optimizer 103 applies a weight of Equation 4 to a cost function based on curves generated by the detector 102 according to distance between the curves and a lens distortion center, outlier differentiation performance according to a lens distortion correction parameter is obtained as indicated by dotted lines of FIG. 8. As indicated by dotted lines, a ratio of pixels exceeding a threshold value in line 3 varies, resulting in a change in outlier detection performance.

The optimizer 103 removes the outliers using the RANSAC algorithm with a cost function having a weight of Equation 4. Then, the optimizer 103 produces a cost function according to the distortion level parameter $k_3$ having the greatest influence on the level of distortion of the inliers using a group of curves of the inliers only, and estimates a value of the distortion level parameter $k_3$ having the greatest influence on the level of distortion whereby the cost function of all the inliers is minimized, thereby finding the final lens distortion level parameter $k_3$.

When the optimizer 103 finishes estimating the lens distortion level parameter $k_3$ having the greatest influence on the level of distortion, the corrector 104 generates new coordinates of entire pixels in the image using Equation 2, and finally generates an image in which lens distortion has been corrected using linear interpolation. A process of processing an image according to an example embodiment of the present invention will be described in detail below with reference to FIG. 10.

Figure 10:
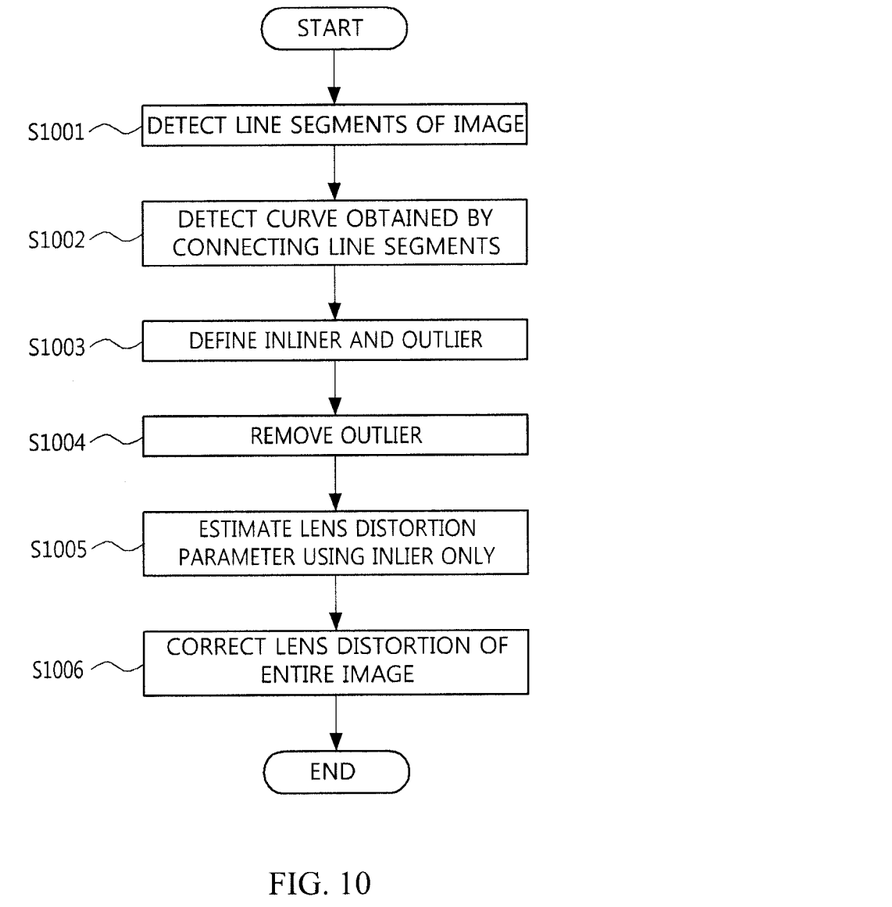
FIG. 10 is a flowchart illustrating an image processing method according to an example embodiment of the present invention.

FIG. 10 is a flowchart illustrating an image processing method according to an example embodiment of the present invention.

Referring to FIG. 10, an image processing apparatus forms one group with pieces of pixel information on an edge of a received image and detects line segments (S1001). At this time, a plurality of short line segments constituting curves are detected.

The image processing apparatus generates a plurality of curves using the detected line segments (S1002). To form one group with various line segments constituting one curve, the image processing apparatus examines a relation between line segments and determines groups to which the line segments belong. To include line segments in the same group, that is, the same curve, the image processing apparatus measures a distance p, an angle a, and a vertical distance d between the respective line segments and connects the line segments. When all of the distance 600*a*, the angle 600*b*, and the vertical distance 600*c* between the line segments are smaller than threshold values, the image processing apparatus designates the line segments as one group, thereby generating a curve. A group indicating a curve in which such line segments are connected may be expressed, and each group stores values of pixels constituting one curve.

The image processing apparatus applies a weight to a cost function based on a plurality of generated curves according to distance from an image center, and defines curves having a shorter length than a threshold value as outliers and curves having a longer length than the threshold value as inliers (S1003).

The image processing apparatus removes the outliers (S1004), and estimates a distortion level parameter that minimizes the cost function using the inliers only (S1005). In an example embodiment of the present invention, the image processing apparatus randomly selects one of M curves on the basis of the RANSAC algorithm, and estimates a distortion parameter whereby a cost function according to the distortion level parameter $k_3$, which has the greatest influence on the level of distortion of the selected curve, is minimized using the Levenberg-Marquardt method. The image processing apparatus linearizes all of the M curves using the estimated distortion parameter according to Equation 1, calculates errors of all pixels constituting detected curves, counts pixels whose errors have absolute values greater than a specific threshold value, and defines a curve as an outlier when a number of counted pixels in the curve is more than a specific ratio according to the number of pixels in the curve. In an example embodiment of the present invention, the image processing apparatus using the RANSAC algorithm expresses the cost function as distance between pixels of a linearized curve and the original curve, and uses a second-order term as shown in Equation 3 to detect a parameter whereby the cost function is minimized. However, it is to be understood that the present invention is not limited to a cost function as shown in Equation 3, and can be applied to all models capable of minimizing the cost function.

The image processing apparatus corrects a position of a pixel with a correction value using the distortion level parameter (S1006). Here, the correction value is set by interpolation between pixel values corrected to an area around coordinates of the pixel. Images before and after an image processing apparatus according to an example embodiment of the present invention performs lens distortion correction will be described below with reference to FIGS. 11 and 12.

Figure 11:
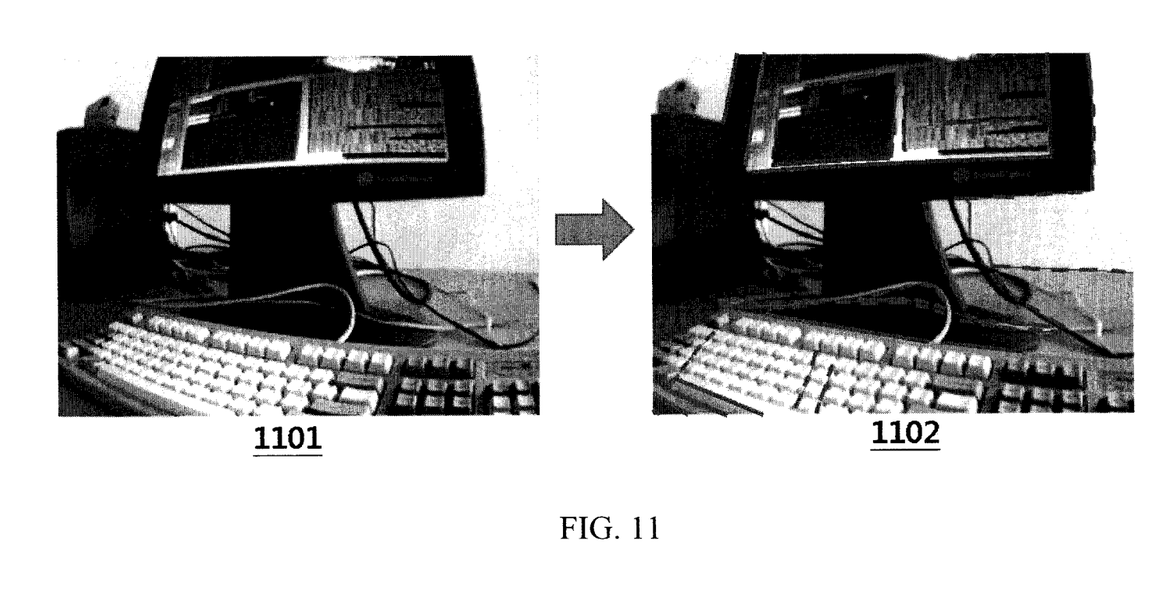
FIGS. 11 and 12 show examples of images before and after an image processing apparatus according to an example embodiment of the present invention performs lens distortion correction.
Figure 12:
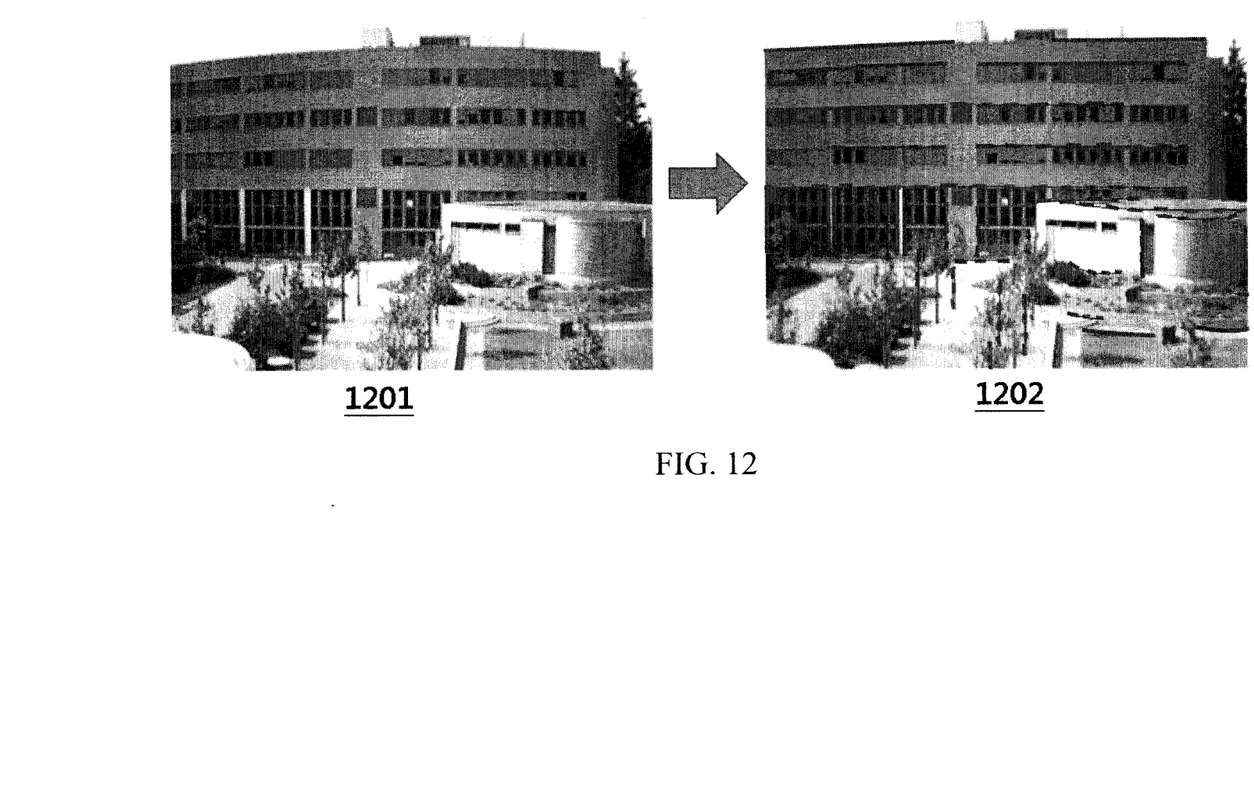

FIGS. 11 and 12 show examples of images before and after an image processing apparatus according to an example embodiment of the present invention performs lens distortion correction.

Referring to FIGS. 11 and 12, left images 1101 and 1201 are images in which lens distortion has occurred. In right images 1102 and 1202, red portions are defined as outliers through an outlier removal process, and green portions are defined as inliers and used for estimating a lens distortion correction parameter. Comparing the images 1101 and 1201 in which lens distortion has occurred before correction with the images 1102 and 1202 after correction shown in FIGS. 11 and 12, lines look curved in the images 1101 and 1201 before correction but look straight or more straight in the images 1102 and 1202 after correction.

Using the above-described apparatus and method for processing an image using lens distortion correction according to example embodiments of the present invention, it is possible to correct lens distortion of even an image that has not been directly photographed, and to correct images generated by devices equipped with any lens rather than a specific camera or photographing apparatus. Also, the apparatus and method differentiate image content improving performance of lens distortion correction and image content deteriorating the performance, thus having a better correction function than other techniques.

While the example embodiments of the present invention and their advantages have been described in detail, it should be understood that various changes, substitutions and alterations may be made herein without departing from the scope of the invention.

What is claimed is:

1. An image processing apparatus, comprising:
a detector configured to form one group with pieces of pixel information on an edge of a received image, detect line segments, and generate a plurality of curves using the detected line segments;
an optimizer configured to apply a weight to a cost function based on the plurality of generated curves according to a distance from a center of the image, define an outlier and an inlier, remove the outlier, and estimate a distortion level parameter; and
a corrector configured to correct a position of a pixel with a correction value using the distortion level parameter.

2. The apparatus of claim 1, wherein the optimizer generates a linearization line segment using the plurality of generated curves and calculates an error of the generated linearization line segment.

3. The apparatus of claim 2, wherein the optimizer defines the line segment as the outlier when an absolute value of the error is greater than a threshold value and the number of corresponding pixels is a predetermined ratio or more according to a number of pixels in a curve.

4. The apparatus of claim 1, wherein the optimizer randomly selects one of the plurality of generated curves, and estimates a distortion level parameter minimizing the cost function according to a distortion level parameter using the selected curve.

5. The apparatus of claim 1, wherein the detector generates the plurality of curves by connecting the detected line segments.

6. The apparatus of claim 1, wherein the correction value is set using interpolation between pixel values corrected to an area around coordinates of the pixel.

7. An image processing method, comprising:
forming one group with pieces of pixel information on an edge of a received image to detect line segments, and generating a plurality of curves using the detected line segments;
applying a weight to a cost function based on the plurality of generated curves according to a distance from a center of the image, to define a curve having a shorter length than a threshold value as an outlier and a curve having a greater length than the threshold value as an inlier;
removing the outlier, and estimating a distortion level parameter minimizing the cost function using the inlier only; and
correcting a position of a pixel with a correction value using the distortion level parameter.

8. The method of claim 7, wherein estimating the distortion level parameter includes generating a linearization line segment using the plurality of generated curves, and calculating an error of the generated linearization line segment.

9. The method of claim 8, wherein estimating the distortion level parameter further includes, when an absolute value of the calculated error is greater than a threshold value and the number of corresponding pixels is a predetermined ratio or more according to a number of pixels in a curve, defining the line segment as the outlier and removing the line segment.

10. The method of claim 7, wherein estimating the distortion level parameter includes randomly selecting one of the plurality of generated curves, and estimating a distortion level parameter minimizing the cost function according to a distortion level parameter using the selected curve.

11. The method of claim 7, wherein generating the curves includes generating the plurality of curves by connecting the detected line segments.

12. The method of claim 7, wherein the correction value is set using interpolation between pixel values corrected to an area around coordinates of the pixel.

* * * * *